(12) United States Patent
O'Rourke et al.

(10) Patent No.: US 6,990,497 B2
(45) Date of Patent: Jan. 24, 2006

(54) DYNAMIC STREAMING MEDIA MANAGEMENT

(75) Inventors: Bret P. O'Rourke, Kirkland, WA (US); Dawson F. Dean, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 09/892,923

(22) Filed: Jun. 26, 2001

(65) Prior Publication Data

US 2003/0009452 A1 Jan. 9, 2003

(51) Int. Cl.
*G06F 17/00* (2006.01)

(52) U.S. Cl. .................................... 707/101; 707/104.1
(58) Field of Classification Search ................. 707/101, 707/100, 4, 3, 1; 709/231, 230
See application file for complete search history.

(56) References Cited

U.S. PATENT DOCUMENTS

| | | | | |
|---|---|---|---|---|
| 5,737,619 A | | 4/1998 | Judson | 715/500 |
| 5,740,549 A | | 4/1998 | Reilly et al. | 705/14 |
| 5,859,660 A | * | 1/1999 | Perkins et al. | 725/32 |
| 5,941,951 A | * | 8/1999 | Day et al. | 709/233 |
| 5,951,646 A | * | 9/1999 | Brandon | 709/231 |
| 5,974,503 A | * | 10/1999 | Venkatesh et al. | 711/114 |
| 5,991,306 A | | 11/1999 | Burns et al. | |
| 5,996,015 A | * | 11/1999 | Day et al. | 709/226 |
| 6,128,627 A | | 10/2000 | Mattis et al. | |
| 6,134,244 A | | 10/2000 | Van Renesse et al. | |
| 6,141,693 A | * | 10/2000 | Perlman et al. | 709/236 |
| 6,151,598 A | | 11/2000 | Shaw et al. | |
| 6,226,672 B1 | * | 5/2001 | DeMartin et al. | 709/219 |
| 6,298,373 B1 | | 10/2001 | Burns et al. | |
| 6,314,451 B1 | | 11/2001 | Landsman et al. | 709/203 |
| 6,345,256 B1 | * | 2/2002 | Milsted et al. | 705/1 |
| 6,349,797 B1 | * | 2/2002 | Newville et al. | 187/396 |
| 6,354,903 B1 | | 3/2002 | Nelson | |
| 6,356,903 B1 | | 3/2002 | Baxter et al. | |
| 6,356,971 B1 | * | 3/2002 | Katz et al. | 710/301 |
| 6,361,326 B1 | | 3/2002 | Fontana et al. | 434/322 |
| 6,366,914 B1 | * | 4/2002 | Stern | 707/10 |
| 6,412,011 B1 | * | 6/2002 | Agraharam et al. | 709/231 |
| 6,553,404 B2 | * | 4/2003 | Stern | 709/203 |
| 6,557,001 B1 | * | 4/2003 | Dvir et al. | 707/101 |
| 6,564,263 B1 | * | 5/2003 | Bergman et al. | 709/231 |
| 6,581,102 B1 | * | 6/2003 | Amini et al. | 709/231 |
| 2001/0013061 A1 | * | 8/2001 | DeMartin et al. | 709/217 |
| 2001/0014103 A1 | | 8/2001 | Burns et al. | |
| 2001/0019658 A1 | * | 9/2001 | Barton et al. | 386/46 |
| 2001/0036355 A1 | * | 11/2001 | Kelly et al. | 386/52 |
| 2002/0059643 A1 | * | 5/2002 | Kitamura et al. | 725/136 |
| 2002/0067730 A1 | * | 6/2002 | Hinderks et al. | 370/395.52 |
| 2002/0072967 A1 | * | 6/2002 | Jacobs et al | 705/14 |
| 2002/0131496 A1 | * | 9/2002 | Vasudevan et al. | 375/240.11 |
| 2002/0138844 A1 | * | 9/2002 | Otenasek et al. | 725/87 |
| 2002/0180803 A1 | * | 12/2002 | Kaplan et al. | 345/810 |

OTHER PUBLICATIONS

Rehm, Eric. "Representing Internet Streaming Media Metadata using MPEG–7 Multimedia Description Schemes." Proceedings of the 2000 ACM Workshops on Multimedia. pp. 93–98. Nov. 2000. ACM Press.*

(Continued)

*Primary Examiner*—Safet Metjahic
*Assistant Examiner*—Brian Goddard
(74) *Attorney, Agent, or Firm*—Lee & Hayes, PLLC (57) ABSTRACT

The described subject matter provides for managing and streaming media content. A server/client component accesses a first playlist that is in a native data format. A translator component translates the first playlist into a canonical data format, forming a second playlist in the canonical format. The content referenced by the second playlist is streamed.

44 Claims, 6 Drawing Sheets

OTHER PUBLICATIONS

Press Release: W3C Issues First Public Draft of Synchronized Multimedia Integration Language (SMIL). Pgs. 1–3. Dec. 1997. Available on the Internet at http://www.w3.org/Press/SMIL.*

Synchronized Multimedia Integration Language (SMIL) 1.0 Specification. Pgs. 1–42. Jun. 1998. Available on the Internet at http://www.w3.org/TR/REC-smil/.*

Gutfreund et al. "CircusTalk: An Orchestration Service for Distributed MultiMedia." Proceedings of the first ACM International Conference on Multimedia. Pgs. 351–358. Sep. 1993. ACM Press.*

Chen et al. "Downloading and Stream Conversion: Supporting Interactive Playout of Videos in a Client Station." Proceedings of the International Conference on Multimedia Computing and Systems, 1995. Pgs. 73–80. May 1995. IEEE Press.*

"Advanced Systems Format (ASF) Specification," Microsoft Europe, Feb. 2001, 19 pages.

Ayers et al., "Synchronized Multimedia Integration Language (SMIL 2.0) Specification," W3C Proposed Recommendation, Jun. 2001, 16 pages.

Roth, Dave, "Windows Media Services Hercules Release: Cache & Proxy," Microsoft Corporation, 2000, 25 pages.

Shulman, Matthew, "Advanced Systems Format Specification," Microsoft Digital Media Division, Feb. 2001, 18 pages.

Hilal, Randa, "A Survey on MPEG–7 A Multimedia Content Description Interface," prepared for Prof. Javed I. Khan, Dept. of Computer Science, Kent State University, Nov. 2001, 24 pages.

* cited by examiner

DYNAMIC STREAMING MEDIA MANAGEMENT

TECHNICAL FIELD

This disclosure relates to streaming multimedia content in networked client/server systems.

BACKGROUND

When a client requests a piece of content such as digital video, audio, or some other sampled content from a server, the client typically provides the global address of the content in the form of a Uniform Resource Locator (URL). The server then accesses the content and sends or "streams" it to the client as a continuous data stream.

There are various file formats for streaming media content and composite media streams. "Advanced Streaming Format" (ASF) is an example of such a file format. ASF specifies the way in which multimedia content is stored, streamed, and presented by the tools, servers, and clients of various multimedia vendors. ASF provides a storage and transmission file format that encapsulates multimedia data types. Images, audio, and video as well as embedded text (e.g., URLs), graphic elements, and hyperlinks associated with elements on a Windows Media Player® interface are examples of items, or content that may be so encapsulated. Such file formats provide for the synchronization of these objects within a stream. Further details about ASF (also known as "WINDOWS Media Container Format) are available from Microsoft Corporation of Redmond, Wash.

Regardless of the streaming file format used, an individual data stream contains a sequence of digital data sets or units. The units represent an image, sound, or some other stimuli that is perceived by a human to be continuously varying. The client renders the units individually, in sequence, to reproduce the original stimuli. For example, an audio data stream includes a sequence of sample values that are converted to a pitch and volume to produce continuously varying sound. A video data stream includes a sequence of digitally specified graphics frames that are rendered in sequence to produce a moving picture.

In the simplest case, the client requests a single streaming media file, to play a single piece of content such as a single song or a single video. Alternatively, a client may request a playlist file that includes references to a number of individual streaming media files, or content.

Each playlist file contains information such as whether to play certain pieces of content more than one time, which pieces of content to play, the order in which to play referenced content, and the like. Playlist files contain references to one or more media streams and describe how pieces of media are combined. Playlists do not contain the actual media data, but rather references to the media data. As a result, playlist files are typically small, generally only containing text, and are generally easy and computationally inexpensive to modify. References to a single piece of media may appear in many playlist files.

Table 1 shows an example of a simple playlist.

TABLE 1

EXAMPLE OF A SIMPLE PLAYLIST

<ASX version = "3.0">
<Title>Title</Title>
<Entry><Ref href = "mms ://nsserver/content/title1.asf"/></Entry>
<Entry><Ref href = "mms ://nsserver/content/title2.asf"/></Entry>
<Entry><Ref href = "mms ://nsserver/content/title3.asf"/></Entry>

TABLE 1-continued

EXAMPLE OF A SIMPLE PLAYLIST

<Entry><Ref href = "mms ://nsserver/content/title4.asf"/></Entry>
</ASX>

Playlist referenced media content can be stored on a Windows Media® server (e.g., mms://ServerName/Path/FileName.asf), a broadcast multicast (e.g., http://WebServerName/Stations/kxyz.nsc), a broadcast unicast that is accessed from a publishing point (e.g., mms://ServerName/PublishingPointAlias), on a Web server e.g., http://WebServerName/Path/Filename.asf), on a network share (e.g., file://\\ServerName\Path\Filename.asf), on a file on a local hard disk drive, and/or the like.

Playlist files have the effect of combining several individual pieces of content into one single complex piece of content, and they are incredibly important to providers of streaming media. They allow content providers to combine advertisements with other content, and therefore build a business based on advertising revenue. They allow Internet radio stations to create a playlist of broadcast songs. They also allow providers to brand their content by attaching previews or radio-station identifiers before or after the content.

For example, if the playlist is a client-side playlist, a script command may be sent to the client in a data stream to instruct Windows Media Player® to cut away from the stream and play other predetermined streams or files according to predetermined playlist/metafile specified scripting in the client-based metafile. This scripting technique can be used for predetermined/specified ad content insertion. To illustrate this, consider that during a live Internet broadcast of a ball game, a script command can be sent at the beginning of every commercial break that instructs each client (e.g., a Windows Media Player®) to play commercials that are already identified in their metafile. When clients finish playing the commercials, scripting in the metafile instructs each client to cut back to the live broadcast.

Playlists are implemented either on a client or on a server such as a WINDOWS Media® server. When the client implements a playlist, the playlist is typically downloaded from a server such as a Web server, a file server, and/or the like. The client interprets the playlist file to present a series of requests to one or more servers to access at least a portion of the content represented in the playlist. A server is generally not aware that the client is requesting content that is referenced in a client-side playlist file. This is because use of a client-side playlist is indistinguishable from a client communicating a number of requests to the server to play several different pieces of content one after the other.

Server-side playlists are maintained by a server and are not downloaded to a client. To access the content represented by a server-side playlist, a client typically selects a URL that identifies a server and a particular playlist. In response, the identified server interprets the playlist to stream the content referenced by the playlist to a client, one piece of content at a time.

Both clients that implement client-side playlists, and servers that implement server-side playlists expect a playlist to be in a predetermined fixed data file format. This is because the playlist must be interpreted, or parsed. To accomplish this, such clients and servers typically include a playlist interpreter that can parse a particular playlist data format. If a playlist is not in the right data format, the server's playlist interpreter will not be able to parse/ understand the content of the playlist.

Such a fixed data file format requirement for representing playlists creates a significant problem. Different content providers will often prefer different playlist data formats, and therefore will use different types of playlist interpreters or servers. In many cases, these interpreters are able to recognize and interpret only a single format. This is a problem for a provider that desires to use a different format because the provider is typically forced to choose either a non-preferred format or a non-preferred interpreter. It also makes it difficult for a provider to simultaneously use two or more different playlist formats.

Figure 1:
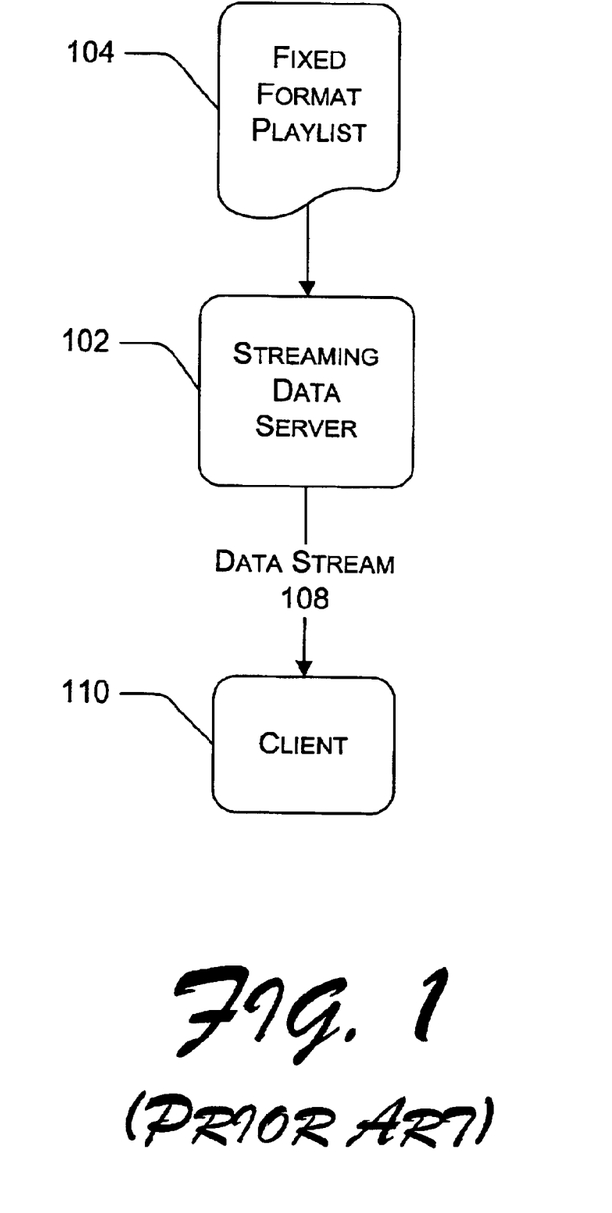
FIG. 1 a block diagram that illustrates the use of a single, fixed format server-side playlist to stream media content to a client.

Referring to FIG. 1, there is a block diagram that illustrates the use of a fixed format playlist 104 to represent media content to stream to a client. Streaming data server 102 accepts a fixed format playlist 104. The fixed format playlist must represent its referenced media content in the fixed format expected by server 102. If it is not in the expected fixed format, the content referenced by the fixed format playlist 104 cannot be interpreted, and thus, cannot be streamed by the server to client 110.

There are yet other problems associated with traditional systems and procedures for streaming content using playlists. For example, there is generally no way to impose a policy with respect to the content represented in a playlist without modifying the playlist itself.

This is a problem because policy can change over time and content that may have been contrary to a first policy may be allowable with a second policy. If an original playlist is modified to meet the requirements of the first policy, then the original playlist may need to be regenerated to recapture the excised content to meet the second policy. In addition, modifying a playlist generally requires that an administrator disable the playlist interpreter or server. This is a significant problem for content servers-continuous, uninterrupted availability is an important characteristic to most providers.

There are any number of scenarios that could require the regeneration or versioning of playlists to meet the imposition of policy requirements. Such playlist regeneration and versioning tasks could be very burdensome to program directors, system administrators, and the like.

Yet another problem associated with traditional systems and procedures for streaming data to a client using server-side playlists is that it is not feasible to stream new content in the middle of other content that is already streaming to a client. This is because generating a new streaming media file is computationally very expensive. It means compressing video and/or audio data. For example, to insert an advertisement into the middle of a movie, a new digital movie with the advertisement in the middle of it would need to be created. This is not a practical solution. Ideally, one could stream new content in the middle of other content that is already streaming to a client without needing to regenerate a new streaming media file.

SUMMARY

The described subject matter provides various implementations to stream media content. In one aspect, a first playlist having a non-canonical data format is accessed. One or more playlist translator components translate the non-canonical data format of the playlist into a different playlist having a canonical data format. The translation is performed in a manner that is independent of any modification of the non-canonical data format playlist. The content referenced by the different playlist having the canonical data format is streamed.

In this manner, media content providers are not required to generate playlist files in any one particular data file format. Rather, a content provider is able to generate a playlist in any preferred data file format, independent of a streaming media server's playlist interpreter's fixed data file format requirements.

In one implementation, a policy is imposed on the content referenced by the canonical data format playlist by one or more playlist transformer components. Although imposing the policy on the canonical data format playlist may result in modification of the playlist, the policy imposition is performed in a manner that is independent of any modification to the non-canonical data format playlist.

DETAILED DESCRIPTION

The following description sets forth a various implementations of subject matter that incorporates features recited in the appended claims. The implementations are described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary System for Playlist and Streaming Media Management

Figure 2:
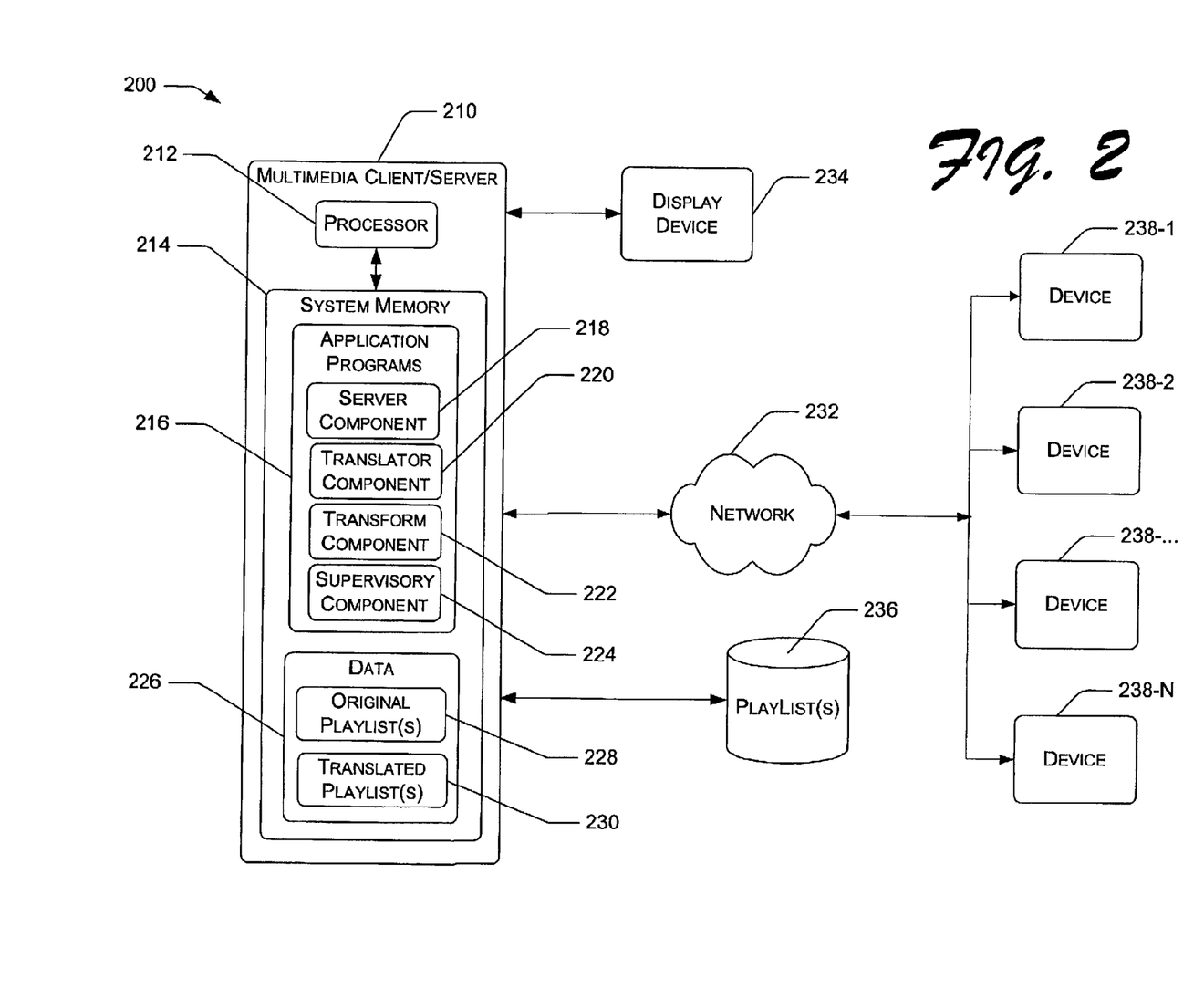
FIG. 2 is a block diagram that illustrates aspects of an exemplary system to stream multimedia content.

FIG. 2 is a block diagram that shows aspects of an exemplary system 200 to dynamically manage and stream multimedia content. The exemplary system is only an example of a suitable computing environment to implement the described inventive subject matter and does not suggest any limitation as to the scope of the subject matter. The system includes a multimedia client/server 210 such as a general purpose computer, a server computer, a Windows Media® server, and/or the like.

The multimedia client/server device 210 is coupled across a network 232 to one or more other devices 238 such as a personal computer, a server computer, and/or the like. The network can be any type of communication network such as the Internet, an organizational intranet, a local-area network (LAN), private wide-area networks, and/or the like.

The multimedia client/server device 210 includes a processor 212 that is coupled to a system memory 214. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The processor 212 is configured to fetch and execute computer program instructions from program modules stored in application programs 216. Such program modules include, for example, an operating system, and other program modules such as a media player (e.g., a WINDOWS® Media Player), a playlist server component 218, one or more playlist translator components 220, one or more playlist transform components 222, a playlist supervisory component 224.

The multimedia client/server 210 utilizes one or more of these components 216 to process requests from a client 238 for streaming media content. The requested media content is referenced in a playlist 228 that is stored as a files in some type of computer-readable memory such as data 226 or in other storage media 236. The multimedia client/server translates such a playlist 228 into a different playlist 230 that is in a canonical data format. Thus, media content providers are not required to generate playlist files 228 in any one particular data file format. Rather, a content provider is able to generate a playlist 228 in any preferred data file format, independent of any playlist data file format requirement.

Although, the canonical playlist data format can be one of any number of different data file formats, in this implementation, the canonical data format is the Synchronized Multimedia Integration Language (version. 2.0), referred to as "SMIL". SMIL is an extension of the World Wide Web Consortium (W3C) standard Extensible Markup Language (XML) file format. SMIL provides syntax and structure to define both high-level instructions and data corresponding to the content referenced by a playlist. The specification for SMIL is well understood in the computing industry.

The content referenced by the canonical data format playlist 130 is either streamed to a client 238, or alternatively, rendered/played, and or the like, by the multimedia client/server itself to reproduce the original stimuli of the referenced content.

In one implementation, the multimedia client/server 210 is connected to a graphical user interface (GUI) to facilitate the examination and manual manipulation of an actively streaming playlist 230 by an administrator.

Playlist server component 218, translator component(s) 220, playlist transform component 222, and supervisory component 224 may either run (a) in the same address space as the server component 218, or (b) as part of another process on the device 210, or (c) on an entirely different computer than the device 210.

In this implementation, components 218, 220, and data structure 230 are Common Object Model (COM) objects. COM objects expose their functionality through clearly defined interfaces. Each interface has one or more methods that are invoked by other objects. Logically related methods are normally organized into a separate interface. The COM protocol is well known, and design tools for creating COM objects are widely available.

Figure 3:
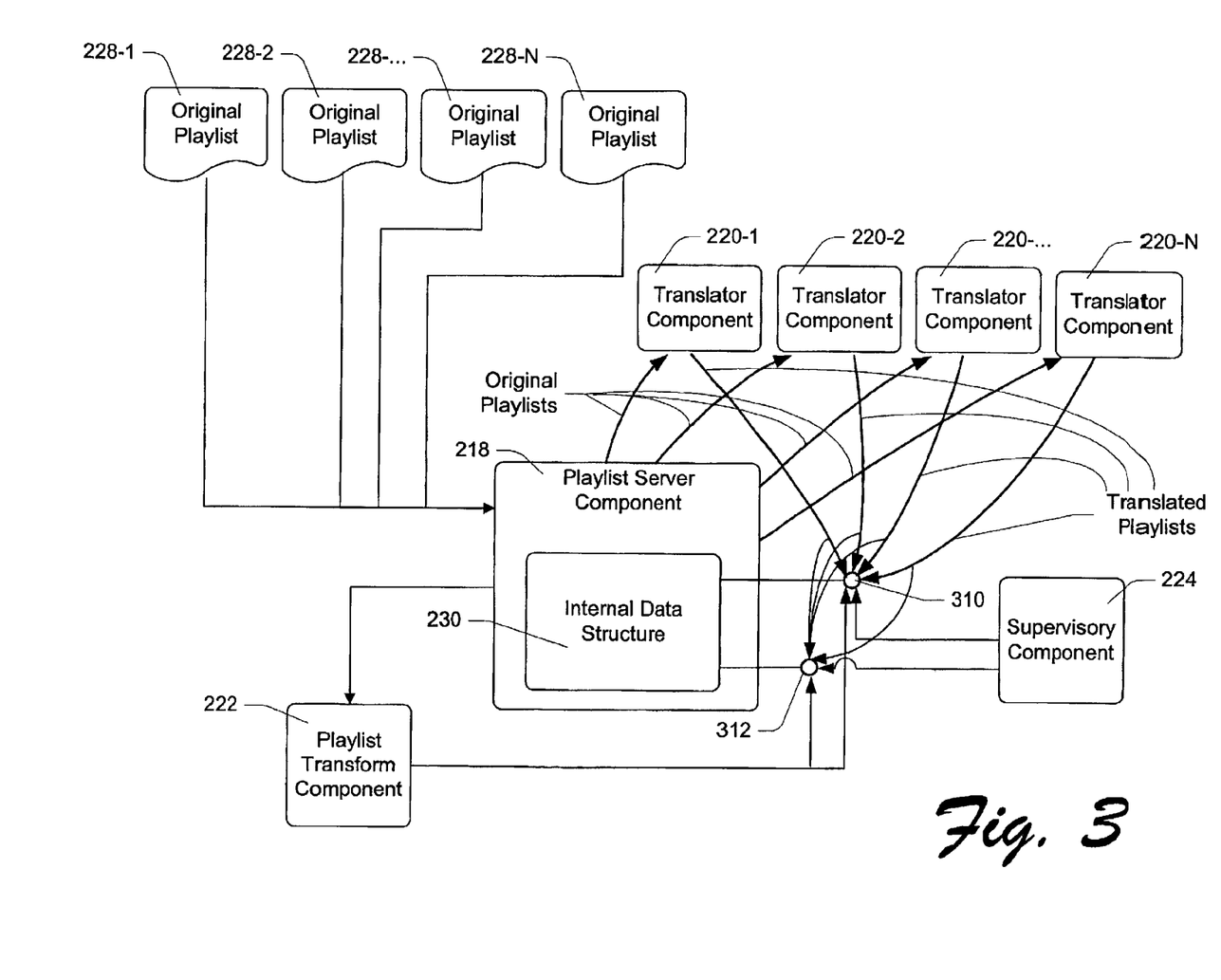
FIG. 3 is a block diagram that illustrates further aspects of exemplary streaming media server/client system.

FIG. 3 is a block diagram that shows further aspects of the exemplary system 200 of FIG. 2 to manage and stream media content. The playlist server component 218 accepts requests from one or more clients 238 for one or more different original playlists 228 that may be in any one of a number of possible playlist data formats. In response, the playlist server locates the requested playlist(s) 228, which reference various multimedia content such as Images, audio, video, as well as embedded text (e.g., URLs), graphic elements, hyperlinks associated with elements on a Windows Media Player® interface, and/or the like.

Such playlist referenced content can be stored on a Windows Media® server (e.g., mms://ServerName/Path/FileName.asf), a broadcast multicast (e.g., http://WebServerName/Stations/kxyz.nsc), a broadcast unicast that is accessed from a publishing point (e.g., mms://ServerName/PublishingPointAlias), on a Web server e.g., http://WebServerName/Path/Filename.asf), on a network share (e.g., file://ServerName/Path/Filename.asf), on a file on a local hard disk drive, and/or the like.

Playlist server component 218 has a data structure 230 that represents a playlist that is internal to the multimedia client/server 210 of FIG. 2. The server dynamically generates a respective internal playlist 230 to manage a data stream to a client 238 whenever the server 210 receives a request from a client that references a playlist 228. There is any number of internal data structures, or internal playlists 230.

Within the playlist server component 218, the internal playlist 230 is represented in a pre-defined, non-variable data format, which will be referred to herein as a "canonical" data format. SMIL is an example of such a canonical data format. The canonical format may or may not be the same format that is used in the actual playlists 228 that are submitted to playlist server 218 for playing.

The playlist server component exposes a canonical application program interface (API) to provide an interface for other program applications (e.g., see, program applications 216 of FIG. 2) to manipulate the contents of the data structure 130. In one implementation the canonical API is a platform and language-neutral interface such as the DOM interface that permits script to access and update the content, structure, and style of the data structure 230.

Interface 310 is exposed by data structure 230 and includes the SMIL interface and a dynamic override interface for providing dynamic control over media content being streamed (or to be streamed) by the server. The SMIL interface allows programmatic addition of media references to the internal playlist 230 and deletion of media references from playlist 230.

In this implementation, the dynamic programmatic override control interface 310 includes a "stream media now" interface command and a "stop streaming media now" interface command. Upon invoking the stream media now interface, which specifies a particular media content item, a program module (such as supervisory component 224) will cause the server 218 to immediately stream a specified media content item. If the server is streaming a content item at the time that a stream media now interface command is received by the server, the server will stop streaming the content item to begin streaming the newly specified content item.

Responsive to invocation of the stop streaming media now interface, the server 218 immediately stops streaming a media content item. If a particular media content item is specified in the override command, the server immediately stops streaming the specified media content item, otherwise, all media content items that are being streamed are stopped.

Although, this implementation describes use of the stream media now and stop media stream now override commands, the programmatic override control interface 310 may include different interfaces, which upon invocation cause the server to immediately stop a particular streaming action to perform a different action.

In operation, the playlist server 218 obtains a playlist 228 in either the canonical data format or in a non-canonical data format. A playlist 228 may be obtained from a variety of sources. The playlist server component 218 then converts or translates the received playlist 228 into the canonical format for internal representation (as internal data structure 230) and interpretation.

To translate playlist 228, the playlist server component 218 provides the playlist to a select one of the translator components 220 based on the data format of the received playlist. For example, one particular translator component may only recognize playlists 228 having a particular data format. In one implementation, a playlist's corresponding data format is determined by evaluation of the contents of the playlist, by the suffix of the playlist's file name, and/or the like.

The selected translator component 220 translates the provided playlist 228 from its native data format into a playlist 230 having a canonical data format. Specific details of how a particular translator component 230 parses a native data format of the provided playlist 228 are up to the particular translator component. For example, a translator component 220 may:

- Parse playlist files written in a particular version of the SMIL format.
- Parse a playlist that includes a list of the contents of a directory on a file system.
- Parse a playlist file format such as a Windows® Media Player file format.
- Query an SQL database to retrieve a list of streaming media content references before translating the information into a playlist 230.
- Parse a playlist and at the same time, insert an advertisement before a reference to a piece of content, the advertisement been selected based on a broad range of criteria, such as the identity of a user, the time of day, or which other advertisements have played recently.

After parsing at least a portion of the provided playlist 228, the selected translator component 220 translates the parsed information into the playlist 230 by calling methods of interface 310. In this implementation, the SMIL interface includes a portion of the interface 310. These methods provide for the insertion of streaming media control instructions and corresponding data into an internal server playlist 230. The translator components create the canonical playlist 230 by repeatedly calling the appropriate methods of interface 310, to insert individual instructions and data as they are translated from the parsed native data format of the original playlist 228.

In this implementation, playlist server component 218 exposes a component registration and/or installation interface (not shown) to allow a plurality of translator components 220 to be registered and/or installed for use with the playlist server 218. To install/register a translator component 220, an interface object or some other software entity calls the appropriate method or methods of the registration/installation interface, and identify the new translator 220 and the playlist data format that the new translator is designed to support.

Each translator component 220 exposes a substantially identical set of interfaces. Thus, once access to a translator component 220 has been provided to server component 218, the server component can interact with that translator component through the translator's implemented interfaces. Specifically, the server component 218 can call any one of the individual translator components to provide a native data format playlist 228 to the translator component. The selected translator component in turn parses and translates the provided native data format playlist, and then uses interface 310 of the playlist server to insert canonical playlist instructions and data into data structure 230.

Accordingly, different or additional translator components 220 can be added to the system 200 at any time. This, in turn, allows the system to receive and execute playlists in various different formats, each of which is supported by one of the translator components. If a new playlist format become available, a corresponding translator component is added to the system, without having to modify the code of the server component 218.

System 200 includes one or more transform components 222 that are provided with playlist server component 218. A transform component is used to impose a policy on the media content referenced by playlist 230. In operation, these transform components use interface 310 to modify the internal playlist of data structure 230 before it is executed. To notify the transform components that the playlist are transformed, the server component generates an event with a reference to the playlist. At least one subset of the provided transform component receives the generated event to impose one or more policies with respect to the content of the playlist.

Imposing a policy can result in a modification to the internal playlist 230. Such modifications include removing a reference from the playlist, adding a reference to the playlist, changing the order of references in the playlist, modifying a reference in the playlist, and the like. This allows policies such as adding commercial content, deleting references to adult material, and the like, to be imposed to suit a particular user or other condition.

To illustrate this, consider that a playlist may be modified based on a policy to contain personalized advertisements targeted at a particular user, or to change a radio station playlist to reflect the time of day (jazz in the morning and heavy-metal late at night). The same policy or another policy may modify a playlist so that a radio station will not play a same song too many times within a particular amount of time such as in a single hour, or the playlist may be modified to remove adult content from the playlist.

The transform components 222 impose such policies on the playlist of data structure 230 without requiring the modification of the original playlist 228. Instead, only the internal, canonical representation 230 of the original playlist 228 is modified. Advantageously, this means that even though a particular policy may change over time, the original playlists will not have to be modified or regenerated to impose the particular policy. Another advantage is that a transform component need only be designed to recognize a single file format, the canonical data file format of a playlist (regardless if it is a data format of playlist 228 or 230). In this manner, regardless of the particular file format of an original playlist 228, and as long as there is a corresponding translator component 220 to translate the original playlist into the canonical data format, a policy may be implemented with respect to the content of the original playlist.

Translator component(s) 220, playlist transform component 222, and supervisory component 224, may invoke at least one portion of interface 312. Interface 312 allows a playlist to be manipulated, or modified to follow an arbitrary sequence of events—a sequence of events that is not constrained by the data format of a playlist 230. Such modifications include, for example, inserting a new reference into a playlist, deleting a reference from the playlist, moving a reference from the first location in the playlist to a second location in the playlist, switching to a different source of streaming media content, switching between live broadcast feeds, and/or the like.

Such a canonical playlist 230 interface 312 provides a substantial advantage over traditional procedures to stream media content referenced by server-side playlists because it provides means for an external entity such as a computer program to cause the server component 218 to follow a sequence of actions that cannot typically be described in the data format of the playlist 230. Such actions include, for example, changing between arbitrary sequences of live camera feeds, and the like. In this example, the data corresponding to the live camera feed does not need to be in a canonical data format because the server component 218 is aware of the source and format of the switched media content.

In one implementation, the system 200 of FIG. 2 includes a supervisory component 224 to control the sequence of streams communicated from the server component 218 to a client 238 by manipulating the contents of the playlist 230. This can be performed using any arbitrary determination/computation.

To control the sequence of streams, the supervisory component 224 periodically calls a particular function/method of interface 312 to set a next content item for the server component 218 to stream. If the method is not called, then the server component continues to execute a sequence of instructions from a data stream in the playlist 230 that was most recently played, if any.

Moreover, through the use of interface 312, the supervisory component could cause the server component to: (a) begin streaming content that is referenced at some other arbitrary position in the playlist; (b) stream the content scripted by an internal playlist 230; (c) insert a reference to content into the playlist sequence that was not before represented in the playlist; (d) interrupt the streaming of a particular media item to cause the server component to stream a different specified media item in place of the interrupted media item, later, if the method of interface 312 is not called, any sequence of events that is thereafter indicated by the playlist 230 will be performed, and/or the like.

Furthermore, the supervisory component 224 can use interface 310 to: examine the currently playing playlist 230, add and delete playlist instructions and data (including references to streaming media content), change an order of streaming media content presentation, dynamically start a particular media stream, dynamically interrupting, or stopping the streaming of one or more media streams, and the like.

Exemplary Procedure to Stream Media From a Server to a Client

Figure 4:
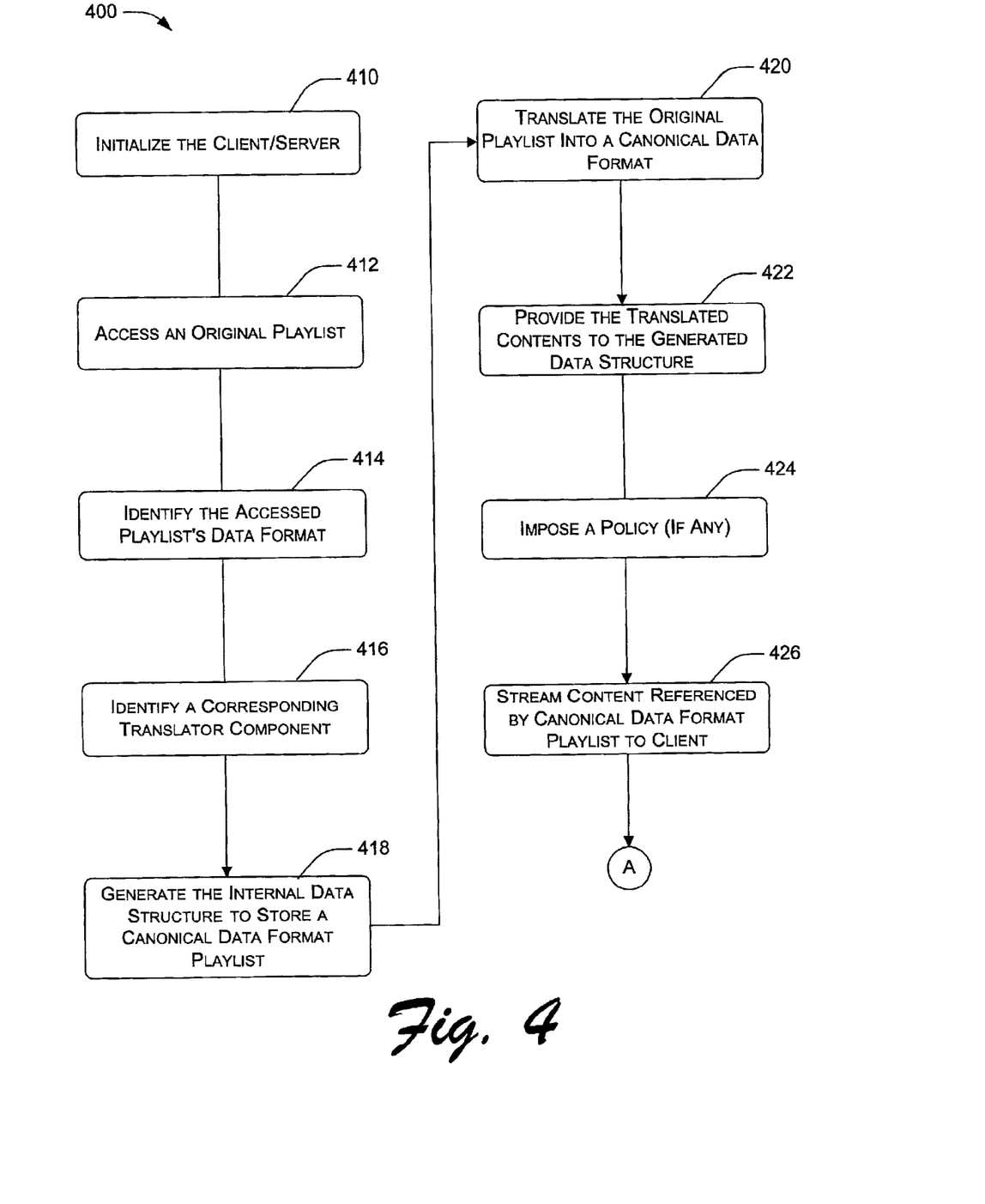
FIG. 4 is a flowchart that illustrates aspects of an exemplary procedure to manage and stream media content.

FIG. 4 shows an exemplary procedure 400 of the system 200 of FIGS. 2 and 3 to manage and stream media content. At block 410 the procedure initializes the multimedia client/server 210 of FIG. 2 by providing one or more translator components 220, and one or more transform components 222. At block 412 the procedure accesses a first playlist. In one implementation, this playlist access is responsive to a request for streaming media content represented in the playlist from a client device that is connected to a streaming media server that implements server-side playlists. In another implementation, the playlist access is responsive to user input at any computer that incorporates the features of multimedia server/client 210 of FIG. 2.

At block 414, the procedure identifies the data format of the accessed playlist. At block 416, the procedure determines a particular translator component based in the identified playlist format (block 414). This is accomplished by referencing respective translator component configuration data to identify supported playlist formats. At block 418 the procedure generates a data structure 230 of FIGS. 2 and 3 that includes a canonical format playlist. At block 420, the procedure provides the accessed playlist (block 412) to the determined translator component (block 416) for parsing and translating the accessed playlist into a canonical data format. At block 422, the procedure (using interface 310 of FIG. 3), stores the translated playlist (block 420), or its individual instructions into the canonical data structure (block 418).

At block 424, the procedure imposes any policies on the translated, or canonical playlist/data structure's referenced media content. At block 426 the procedure streams the content referenced by the canonical data structure to a client for playing/rendering. Alternatively, at block 426, the client/server 210 of FIG. 2 renders/plays the content referenced by the canonical data structure. The procedure 400 continues at block 510 as shown in FIG. 5.

Figure 5:
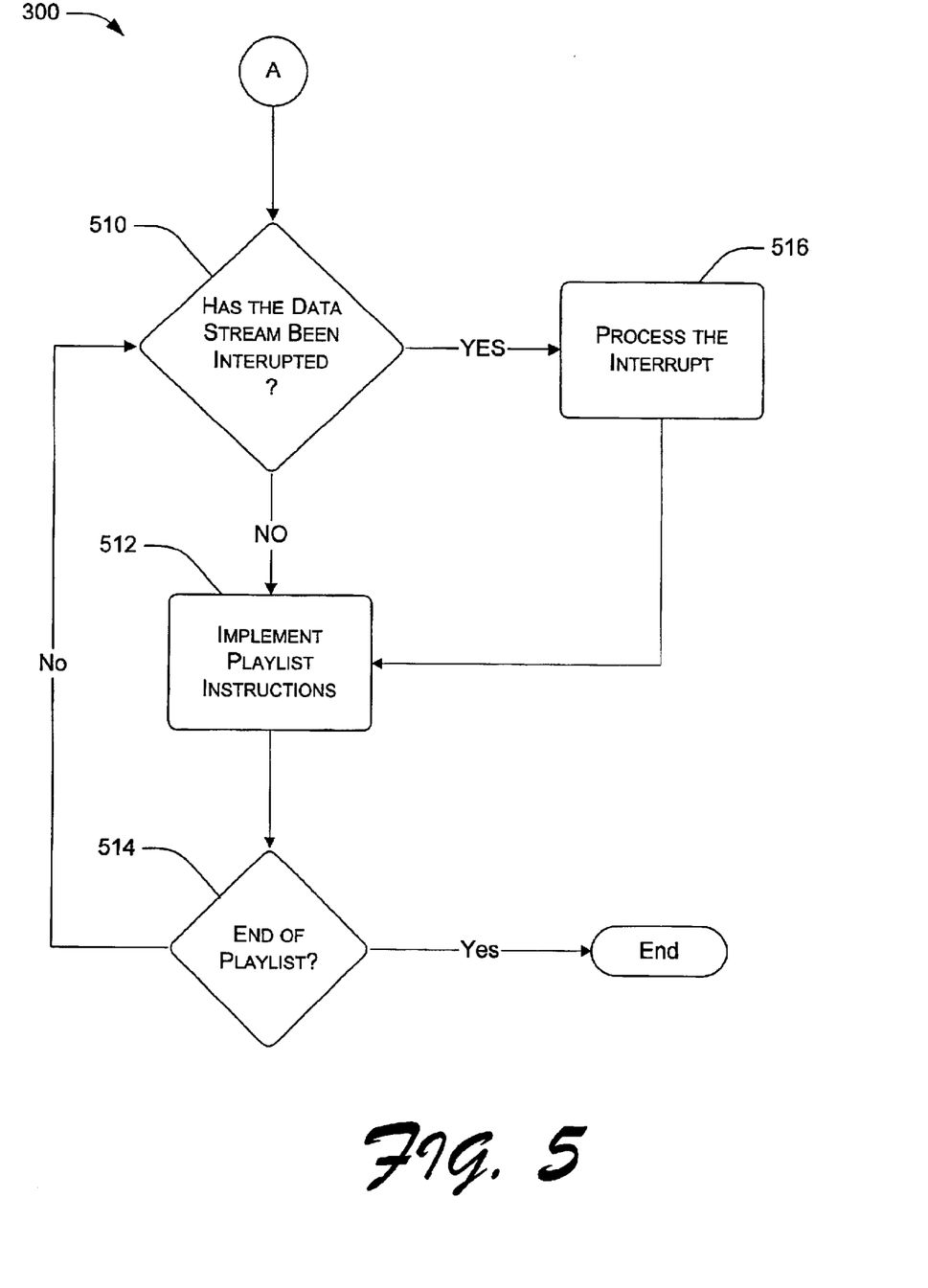
FIG. 5 is a flowchart that illustrates further aspects of an exemplary procedure to manage and stream media content.

FIG. 5 is a flowchart that shows further aspects of an exemplary procedure 400 of FIG. 4 to use server-side playlist components to manage and stream multimedia content. At block 510, the procedure determines if the data stream has been interrupted (e.g., in response to a request by a supervisory component 224 of FIG. 2). At block 512, the data stream not having been interrupted, the procedure continues with the implementation of any playlist instructions. At block 514, the procedure determines if it has reached the end of the playlist. If so, the procedure ends. Otherwise, the procedure continues streaming the referenced data and is receptive to any requests to interrupt the data stream as described above in reference to block 510.

At block 516, the data stream having been interrupted (e.g., in response to a request by a supervisory component 224 of FIG. 2), the procedure processes the interrupt, which may require the modifying the playlist, interrupting currently streaming content to stream other specified content, and/or the like. At block 512, the procedure continues to stream data (if any) that is referenced by the playlist according to the playlist instructions.

Exemplary Computer Environment

The subject matter is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the subject matter may be practiced with other computer system configurations, including hand-held devices, multi-processor systems, microprocessor-based or programmable consumer electronics, network PCs, minicomputers, mainframe computers, and the like. In a distributed computer environment, program modules may be located in both local and remote memory storage devices.

Figure 6:
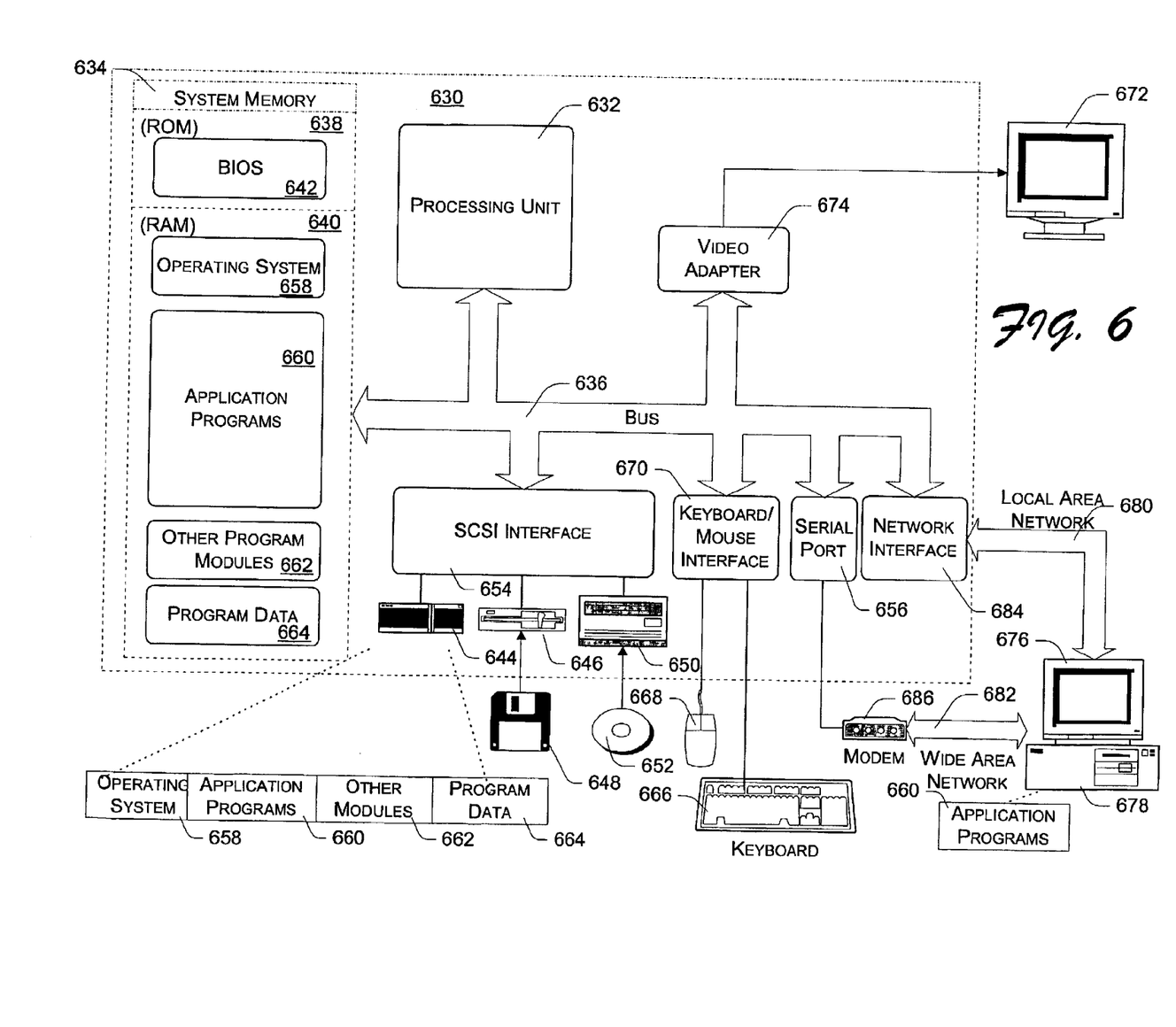
FIG. 6 is a block diagram that illustrates aspects of an exemplary environment to stream multimedia content.

FIG. 6 shows a general example of a computer 630 that is used as a server in accordance with the subject matter. Computer 630 is shown as an example of a computer that can perform the functions of a multimedia client/server computer 210 of FIG. 2. Computer 630 includes one or more processors or processing units 632, a system memory 634, and a bus 636 that couples various system components including the system memory 634 to processors 632.

The bus 636 represents one or more of any of several types of bus structures, including a memory bus or memory controller, a peripheral bus, an accelerated graphics port, and a processor or local bus using any of a variety of bus architectures. The system memory includes read only memory (ROM) 638 and random access memory (RAM) 640. A basic input/output system (BIOS) 642, containing the basic routines that help to transfer information between elements within computer 630, such as during start-up, is stored in ROM 638. Computer 630 further includes a hard disk drive 644 for reading from and writing to a hard disk, not shown, a magnetic disk drive 646 for reading from and writing to a removable magnetic disk 648, and an optical disk drive 650 for reading from or writing to a removable optical disk 652 such as a CD ROM or other optical media. The hard disk drive 644, magnetic disk drive 646, and optical disk drive 650 are connected to the bus 636 by an SCSI interface 654 or some other appropriate interface. The drives and their associated computer-readable media provide nonvolatile storage of computer readable instructions, data structures, program modules and other data for computer 630.

Although the exemplary environment described herein employs a hard disk, a removable magnetic disk 648 and a removable optical disk 652, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 648, optical disk 652, ROM 638, or RAM 640, including an operating system 658, one or more application programs 660, other program modules 662, and program data 664.

A user may enter commands and information into computer 630 through input devices such as keyboard 666 and pointing device 668. Other input devices (not shown) may include a microphone, joystick, game pad, satellite dish, scanner, or the like. These and other input devices are connected to the processing unit 632 through interface 670 that is coupled to bus 636. Monitor 672 or other type of display device is also connected to bus 636 via an interface, such as video adapter 674.

Computer 630 operates in a networked environment using logical connections to one or more remote computers, such as a remote computer 676. The remote computer 676 may be another personal computer, a server, a router, a network PC, a peer device or other common network node, and typically includes many or all of the elements described above relative to computer 630, although only a memory storage device 678 has been illustrated in FIG. 6. Computer 676 is shown as an example of a computer that can perform the functions of a client computer 238 of FIG. 2. The logical connections depicted in FIG. 6 include a local area network (LAN) 680 and a wide area network (WAN) 682. Such networking environments are commonplace in offices, enterprise-wide computer networks, intranets, and the Internet.

When used in a LAN networking environment, computer 630 is connected to the local network 680 through a network interface or adapter 684. When used in a WAN networking environment, computer 630 typically includes a modem 686 or other means for establishing communications over the wide area network 682, such as the Internet. The modem 686, which may be internal or external, is connected to the bus 636 via a serial port interface 656. In a networked environment, program modules depicted relative to the personal computer 630, or portions thereof, may be stored in the remote memory storage device. It will be appreciated that the network connections shown are exemplary and other means of establishing a communications link between the computers may be used.

Generally, the data processors of computer 630 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory.

The subject matter described herein includes these and other various types of computer-readable storage media when such media contain instructions or programs for implementing the steps described below in reference to FIG. 6 in conjunction with a microprocessor or other data processor.

The subject matter also includes the computer itself when programmed according to the methods and techniques described below. Furthermore, certain sub-components of the computer may be programmed to perform the functions and steps described below. The subject matter includes such sub-components when they are programmed as described. In addition, the subject matter described herein includes data structures, described below, as embodied on various types of memory media.

For purposes of illustration, data, programs and other executable program components, such as the operating system are illustrated herein as discrete blocks, although it is recognized that such programs and components reside at various times in different storage components of the computer, and are executed by the data processor(s) of the computer.

Conclusion

The described subject matter provides a number of significant advantages as compared to the prior art. For example, playlist authors can use and distribute any playlist format as long as a corresponding playlist translator is supplied. Also, the subject matter provides for the imposition of arbitrary content filters or policies without requiring modification of the original playlist. Further, the system allows an administrator to manually modify an actively streaming playlist according to an arbitrary sequence determined by the administrator without modifying the original playlist.

Although the subject matter has been described in language specific to structural features and/or methodological operations, it is to be understood that the subject matter defined in the appended claims is not necessarily limited to the specific features or operations described. Rather, the specific features and operations are disclosed as exemplary forms of implementing the claimed subject matter.

To illustrate this, consider that although various program modules 216 and data structure 230 of FIG. 2 were described as using COM, it is not necessary that any program module or data structure be implemented as a COM object. Rather, the modules and data structures could use some other technology, proprietary or otherwise, to expose respective functionalities through a clearly defined interface.

What is claimed is:

1. A method for managing streaming media content, the method comprising:

accessing, by a computing device, a first playlist that has a non-canonical data format;

providing, by a computing device, a plurality of translators that translate playlists from a plurality of different non-canonical formats to a canonical playlist format;

calling, by a computing device, one of the translators to translate the first playlist into the canonical playlist format, forming a second playlist in the canonical playlist format; and retrieving, by a computing device, media content referenced by the second playlist.

2. A method as recited in claim 1, wherein retrieving, the computing device is a server that is coupled to a client computing device, and wherein retrieving further comprises:
streaming, by the server, content referenced by the second playlist to the client computing device.

3. A method as recited in claim 1, wherein accessing, providing, calling, and retrieving are performed by a single computing device, and wherein the method further comprises rendering/playing, by the single computing device, content referenced by the second playlist in a manner that the single computing device is a client for the content.

4. A method as recited in claim 1, wherein forming a second playlist in the canonical format comprises dynamically generating, by a computing device, a data structure comprising the second playlist, the data structure being used to manage streaming content referenced by the second playlist.

5. A method as recited in claim 1, further comprising dynamically interrupting, by a computing device, a particular media item as it is being streamed from the second playlist.

6. A method as recited in claim 1, further comprising dynamically streaming, by a server computing device, a different set of media content to a client computing device coupled to the server computing device across a network, the different media content not being represented in the second playlist.

7. A method as recited in claim 1, wherein the translators are COM objects.

8. A method as recited in claim 1, wherein the canonical playlist format is a Synchronized Multimedia Integration Language (SMIL) data format.

9. A method as recited in claim 1, further comprising creating, by a computing device, the second playlist via a SMIL interface.

10. A method as recited in claim 1, further comprising:
providing, by a computing device, one or more transformers that impose respective policies on content referenced by the first playlist; and,
notifying, by a computing device, at least one transformer of the one or more transformers to impose a policy on content referenced, by the second playlist.

11. A method as recited in claim 10, wherein responsive to notifying, the method further comprises, imposing, by the at least one transformer, the policy results in a modification to the second playlist, the modification removing a reference from the second playlist, adding a reference to the second playlist, changing the order of references in the second playlist; or modifying a reference to content in the second playlist.

12. A method as recited in claim 10, wherein the one or more transformers are one or more corresponding COM objects.

13. A method as recited in claim 1, further comprising:
modifying, by a supervisory component the second playlist to insert a new reference into the second playlist, delete a reference from the second playlist, change an order of associated media content references, or modify a reference in the second playlist; and
wherein the modifying is performed while streaming media referenced by the second playlist to a client computing device.

14. A method as recited in claim 13, wherein the modifying comprises dynamically interrupting, by the supervisory component, a particular media item as it is being streamed to insert another media item.

15. A method as recited in claim 13, further comprising:
dynamically interrupting, by the supervisory component, a particular media item as it is being streamed;
streaming, by the supervisory component, another media item; and
resuming, by the supervisory component, a set of operations specified by the second playlist.

16. A method as recited in claim 13, wherein the supervisory component is a COM object.

17. A method for managing streaming media content, the method comprising:
accessing, by a computing device, a playlist;
imposing, by the computing device, a policy on the content referenced by the playlist in a manner that is independent of a modification to the playlist, wherein imposing the policy results in a particular set of media references in a second playlist; and
retrieving, by a computing device, media content referenced by the particular media references.

18. A method as recited in claim 17, wherein imposing the policy further comprises removing, by the computing device, a media content reference, adding a media content reference, changing an order of media content references, or modifying a media content reference.

19. One or more computer-readable media comprising computer-executable instructions for implementing the method of claim 17.

20. A computer-readable media comprising computer-executable instructions to manage streaming media content, the computer-executable instructions comprising:
a playlist server component that uses a canonical playlist to represent playlists, each canonical playlist having a canonical format;
translator components for use by the playlist server component, the translator components accepting non-canonical playlists having non-canonical formats for translation to the canonical format;
wherein the playlist server performs operations comprising:
receiving a non-canonical playlist;
providing the non-canonical playlist to one of the translator components to translate the non-canonical playlist into the canonical format for addition to the canonical playlist; and;
streaming media referenced by the canonical playlist.

21. A computer-readable media as recited in claim 20, wherein at least one subset of the translator components are provided for use by the playlist server component independent of any modification to the playlist server component.

22. A computer-readable media as recited in claim 20, wherein the playlist server performs operations further comprising dynamically interrupting a particular media item as it is being streamed from the canonical playlist.

23. A computer-readable media as recited in claim 20, wherein the playlist server performs operations further comprising dynamically streaming a different set of media content to a client, the different media content not being represented in the canonical playlist.

24. A computer-readable media as recited in claim 20, wherein the canonical data format is SMIL data format.

25. A computer-readable media as recited in claim 20, wherein the components comprise Component Object Model (COM) objects.

26. A computer-readable media as recited in claim 20, wherein the components further comprise:

a supervisory component that communicates with the playlist server component to dynamically modify the canonical playlist while the playlist server component streams the content referenced by the canonical playlist.

27. A computer-readable media as recited in claim 26, wherein the supervisory component uses a graphical user interface to visualize and manually manipulate elements and attributes of the canonical playlist.

28. A computer-readable media as recited in claim 20 the components further comprising:
   a playlist transformation component that receives a playlist and imposes a content policy on the playlist; and
   wherein the server performs a further operation of providing the canonical playlist to the playlist transformation component to impose the policy on the content referenced by the canonical playlist.

29. A computer-readable media as recited in claim 28, wherein providing the canonical playlist to the playlist transformation component results in a modification to the canonical playlist, the modification removing a reference from the second playlist, adding a reference to the second playlist, changing the order of the playlist references, or modifying a reference in the canonical playlist.

30. A computer comprising a processor coupled to the computer-readable media of claim 20, the processor being configured to execute the computer-executable instructions.

31. A computer for managing media content, comprising:
   a processor coupled to a memory comprising computer-executable instructions, the processor being configured to fetch and execute the computer-executable instructions, the computer-executable instructions comprising instructions for:
   accessing a first playlist that has a non-canonical format;
   providing a plurality of translators to translate playlists from a plurality of different native data formats to a canonical data format; and
   invoking one of the translators to translate the first playlist into the canonical data format, forming a second playlist that is based on the canonical data format.

32. A computer as recited in claim 31, wherein the computer-executable instructions further comprise instructions for streaming content referenced by the second playlist to a client device that is operatively coupled to the computer.

33. A computer as recited in claim 31, wherein the computer-executable instructions further comprise instructions for rendering/playing the content referenced by the second playlist in a manner that the computer itself is a client for the content.

34. A computer as recited in claim 31, wherein the plurality of translators are COM objects.

35. A computer as recited in claim 31, wherein the computer-executable instructions further comprise instructions for dynamically interrupting a particular media item as it is being streamed.

36. A computer as recited in claim 31, wherein the computer-executable instructions further comprise instructions for dynamically streaming a different set of media content, the different media content not being represented in the second playlist.

37. A computer as recited in claim 31, wherein the computer-executable instructions further comprise instructions for:
   interrupting a particular media item as it is being streamed;
   streaming another media item; and
   resuming a set of operations specified by the second playlist.

38. A computer as recited in claim 31, wherein the canonical playlist format is a SMIL data format.

39. A computer as recited in claim 31, wherein a SMIL interface is used to form the second playlist.

40. A computer as recited in claim 31, wherein the processor is further configured to perform operations comprising:
   providing a plurality of transformers that impose respective policies on content referenced by the first playlist; and,
   notifying one of the transformers to impose a policy on content referenced by the second playlist.

41. A computer as recited in claim 40, wherein imposing the policy results in a modification to the second playlist, the modification being selected from a group comprising (a) removing a reference from the second playlist, (b) adding a reference to the second playlist, (c) changing the order of references in the second playlist, and (d) modifying a reference in the second playlist.

42. A computer as recited in claim 40, wherein the server and the plurality of transformers are COM objects.

43. A computer as recited in claim 31, wherein the processor is further configured to perform an operation comprising dynamically modifying the second playlist while streaming the media referenced by the second playlist, the modification being selected from a group of modifications comprising (a) inserting a new reference into the second playlist, (b) deleting a reference from the second playlist, (c) changing the order of the references; and (d) modifying a reference in the second playlist.

44. A computer as recited in claim 43, wherein the dynamically modifying further comprises interrupting a particular media item as it is being streamed to stream a different media item.

* * * * *

UNITED STATES PATENT AND TRADEMARK OFFICE
CERTIFICATE OF CORRECTION

PATENT NO. : 6,990,497 B2  Page 1 of 1
APPLICATION NO. : 09/892923
DATED : January 24, 2006
INVENTOR(S) : O'Rourke et al.

It is certified that error appears in the above-identified patent and that said Letters Patent is hereby corrected as shown below:

On the Title Page, Item (56), under "U.S. Patent Documents", line 20, after "Jacobs et al" insert -- . --.

In column 13, line 45, in Claim 10, after "referenced" delete ",".

Signed and Sealed this

Twenty-third Day of March, 2010

David J. Kappos
*Director of the United States Patent and Trademark Office*